United States Patent
Pust et al.

(10) Patent No.: US 7,031,122 B2
(45) Date of Patent: Apr. 18, 2006

(54) MAGNETIC SHIELDS FOR REDUCED VARIATIONS OF HEAD-MEDIA SPACING

(75) Inventors: Ladislav Rudolf Pust, Savage, MN (US); Declan Macken, Prior Lake, MN (US); Mark Thomas Kief, Savage, MN (US); Yifan Zhang, Eden Prairie, MN (US); Venkateswara Inturi, Shakopee, MN (US); Richard Paul Larson, Brooklyn Park, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 223 days.

(21) Appl. No.: 10/206,739

(22) Filed: Jul. 26, 2002

(65) Prior Publication Data

US 2003/0081359 A1    May 1, 2003

Related U.S. Application Data

(60) Provisional application No. 60/342,238, filed on Dec. 21, 2001, provisional application No. 60/335,070, filed on Oct. 26, 2001.

(51) Int. Cl.
*G11B 5/39* (2006.01)
*G11B 5/255* (2006.01)

(52) U.S. Cl. ........................... 360/319; 360/126
(58) Field of Classification Search ................ 360/317, 360/319, 126
See application file for complete search history.

(56) References Cited

U.S. PATENT DOCUMENTS

| | | | | |
|---|---|---|---|---|
| 4,304,576 A | * | 12/1981 | Hattori et al. ................ 51/309 |
| 5,710,683 A | | 1/1998 | Sundaram .................... 360/126 |
| 5,818,684 A | * | 10/1998 | Iwasaki et al. ............. 360/319 |
| 5,838,521 A | * | 11/1998 | Ravipati ..................... 360/319 |
| 5,896,243 A | | 4/1999 | Koshikawa et al. ..... 360/234.7 |
| 5,898,542 A | | 4/1999 | Koshikawa et al. ..... 360/234.7 |
| 5,907,457 A | * | 5/1999 | Kudo et al. .............. 360/246.2 |
| 5,909,340 A | | 6/1999 | Lairson et al. .......... 360/237.1 |
| 5,949,627 A | | 9/1999 | Williams et al. ............ 360/126 |
| 5,969,910 A | * | 10/1999 | Imagawa et al. ........... 360/319 |
| 5,991,113 A | | 11/1999 | Meyer et al. ................. 360/75 |
| 6,169,646 B1 | * | 1/2001 | Macken et al. ............. 360/319 |
| 6,275,360 B1 | * | 8/2001 | Nakamoto et al. .......... 360/319 |
| 6,292,334 B1 | * | 9/2001 | Koike et al. ................ 360/319 |

(Continued)

OTHER PUBLICATIONS

Shibaya et al., "Preparation by Sputtering of Thick Sendust Film Suited for Recording Head Core," *IEEE Transactions on Magnetics*, vol. 13, No. 4, pp. 1029-1035, (Jul. 1977).

(Continued)

*Primary Examiner*—Jefferson Evans

(57) ABSTRACT

The invention offers a magnetic recording head that includes a substrate, a read sensor, and at least one shield positioned adjacent to the read sensor, wherein the shield contributes to thermal pole-tip recession in an amount less than about 0.5 Å/° C. The invention also offers a magnetic recording head that includes a substrate having a coefficient of thermal expansion, a read sensor, and at least one shield, positioned adjacent to the read sensor, that has a coefficient of thermal expansion within $\pm 2 \times 10^{-6}/°$ C. of the coefficient of thermal expansion of the substrate. The invention further offers a magnetic recording head that includes a substrate, a read sensor, and at least one shield, positioned adjacent the read sensor, with a thickness of from about 0.05 μm to about 0.5 μm.

32 Claims, 4 Drawing Sheets

U.S. PATENT DOCUMENTS

| | | | |
|---|---|---|---|
| 6,385,015 B1* | 5/2002 | Narumi et al. | 360/319 |
| 6,396,670 B1* | 5/2002 | Murdock | 360/319 |
| 6,430,009 B1* | 8/2002 | Komaki et al. | 360/319 |
| 6,437,949 B1* | 8/2002 | Macken et al. | 360/319 |
| 6,452,760 B1* | 9/2002 | Inaguma et al. | 360/319 |
| 6,456,466 B1* | 9/2002 | Nakamoto et al. | 360/319 |
| 6,456,467 B1* | 9/2002 | Mao et al. | 360/319 |
| 6,496,335 B1* | 12/2002 | Gill | 360/319 |
| 6,563,677 B1* | 5/2003 | Narumi et al. | 360/319 |
| 6,580,586 B1* | 6/2003 | Biskeborn | 360/319 |
| 6,654,209 B1* | 11/2003 | Seigler et al. | 360/322 |
| 6,661,605 B1* | 12/2003 | Pust et al. | 360/126 |
| 6,661,625 B1* | 12/2003 | Sin et al. | 360/324.2 |
| 6,679,762 B1* | 1/2004 | Fatula, Jr. et al. | 451/53 |
| 6,734,671 B1* | 5/2004 | Murata et al. | 324/252 |
| 2001/0028538 A1* | 10/2001 | Watanabe et al. | 360/319 |
| 2003/0086215 A1* | 5/2003 | Kief et al. | 360/319 |

OTHER PUBLICATIONS

Stoney, "The Tension of Metallic Films Deposited by Electrolysis," *Proceedings of the Royal Society of London. Series A, Containing Papers of a Mathematical and Physical Character,* vol. 82, Issue 553 pp. 172-175, (May 6, 1909).

* cited by examiner

MAGNETIC SHIELDS FOR REDUCED VARIATIONS OF HEAD-MEDIA SPACING

This application claims priority to U.S. Provisional Application Ser. No. 60/335,070 filed on Oct. 26, 2001, entitled "Magnetic Shields for Reduced Variations of Head-Media Spacing", and U.S. Provisional Application Ser. No. 60/342,238, filed on Dec. 21, 2001, entitled "Reduced TPTR Using Very Thin Shields."

FIELD OF THE INVENTION

The invention relates generally to magnetic recording heads and in particular to a magnetic recording head having shields that have a smaller contribution to thermal pole tip recession.

BACKGROUND OF THE INVENTION

Typical magnetic read/write configurations have the magnetic storage media, a flat magnetic disc, mounted rotatably in close proximity to a magnetic transducer head and its corresponding support structure. In high capacity devices, the discs are rotated at high speeds to create an air cushion or bearing that supports each transducer head at a controlled distance from the disc, called the flying height, or fly height.

A general trend in magnetic storage media is to increase the storage density of the medium. As the storage density increases, the transducer head must be flown closer to the medium so that it can distinguish between adjacent storage areas on the medium. However, the fly height has to be high enough so that the head does not contact the surface of the storage medium. With the advances in storage media in recent years, the fly height has necessarily been reduced from about 0.25 μm to less than about 0.01 μm. At such low fly heights, a number of factors can affect performance of the transducer. These factors include surface roughness, structural variations of the transducer, and structural variations of the support structure of the transducer.

During the use of magnetic storage medium, the temperature of the storage medium, the transducer, and the supporting structure of the transducer increases. At low fly heights, effects from this temperature change, also called thermal effects, can have an impact on transducer performance. Thermal effects include the expansion of a material when its temperature increases. The expansion of a material when heated can be quantified by a temperature coefficient of thermal expansion (CTE). Materials with a higher coefficient of thermal expansion expand more in response to a given temperature increase.

The CTE of a material can vary at different temperatures. For materials used in magnetic recording heads, the relevant CTE of the material is the CTE within normal head operating temperatures. Generally, normal head operating temperatures range from room temperature to about 150° C. The term CTE as used throughout this specification is understood to mean the CTE within normal head operating temperatures.

Generally, the transducer is recessed from the air bearing surface (ABS). As the temperature of the storage media and the transducer increases, the material of the transducer will expand and protrude with respect to the ABS. This results in the transducer being closer to the storage media at higher temperatures and farther away at lower temperatures. This phenomena is referred to as the Thermal Pole Tip Recession (T-PTR).

In order to attain a low fly height without contact between the head and the medium under all operating temperatures, the T-PTR should be low. Variation of transducer recession with temperature may not only significantly impact the transducer's electrical and fly performance but it may also cause extensive thermal asperities and head crash at higher temperatures. With increasing recording areal density and correspondingly decreasing fly heights, the change in head-media spacing due to temperature effects has a more pronounced effect.

In a typical recording head the magnetic shields of the transducer are made from a Ni Fe alloy with a composition close to about 20% Fe and 80% Ni. This composition has very good magnetic shielding properties, but has a very large CTE of about 12 to $13 \times 10^{-6}$/° C. Other configurations of magnetic recording heads use Sendust as a bottom shield material, this material also has an unacceptably high CTE from 12 to $17 \times 10^{-6}$/° C. (from G. Stoney, Proc Roy. Sco. London, A82, pp. 172 and H. Shibaya and I. Fukuda, IEEE Trans. Mag. V13 no. 4, 1977 pp. 1029). Because of these high CTEs, the shields of the transducer are the major contributor to T-PTR and the resulting temperature dependent variations of head-media spacing.

In order to attain reliable magnetic recording heads with very low fly heights, the contribution of the magnetic shields to T-PTR must be minimized. Current magnetic recording heads do not minimize this contribution and consequently there remains a need for a magnetic recording head with shields that have a smaller contribution to T-PTR.

SUMMARY OF THE INVENTION

The invention provides magnetic recording heads having magnetic shields that make a smaller contribution to T-PTR than do magnetic shields in prior art magnetic recording heads.

One embodiment of the invention offers a magnetic recording head that includes a substrate, a read sensor, and at least one shield positioned adjacent to the read sensor, where the shield contributes to thermal pole-tip recession in an amount less that about 0.4 Å/° C.

Another embodiment of the invention offers a magnetic recording head that includes a substrate having a coefficient of thermal expansion, a read sensor, and at least one shield, positioned adjacent to the read sensor, that has a coefficient of thermal expansion within $\pm 2 \times 10^{-6}$/° C. of the coefficient of thermal expansion of the substrate.

In one embodiment, a magnetic recording head includes a bottom and/or top shield made from a magnetic material with a coefficient of thermal expansion (CTE) within $\pm 2 \times 10^{-6}$/° C. of the substrate. Magnetic recording heads made with such shields have significantly less protrusion from both shields and poles at higher operating temperature of the read/write head. Only a head that minimizes the variability of head-media spacing regardless of drive operating temperature can perform well at high recording density.

Yet another embodiment includes a magnetic recording head that includes a substrate, a read sensor, and at least one shield, positioned adjacent the read sensor, with a thickness of from about 0.05 μm to about 0.5 μm.

DETAILED DESCRIPTION OF THE INVENTION

The invention offers magnetic recording heads having magnetic shields that make a smaller contribution to thermal pole tip recession (T-PTR) than do magnetic shields of prior art magnetic recording heads. These magnetic shields have a contribution to T-PTR of less than about 0.4 Å/° C. In another embodiment, the magnetic shields have a contribution to T-PTR of less than about 0.3 Å/° C.

The T-PTR can be quantified by measuring the distance that the specific portion of the magnetic recording head protrudes with respect to the slider body as a function of increased temperature, or retracts as a function of decreased temperature. Specific methods of measuring T-PTR are well known to those of ordinary skill in the art.

In one embodiment, the invention offers a magnetic recording head that includes a substrate having a coefficient of thermal expansion, a read sensor, and at least one shield positioned adjacent the read sensor, wherein the shield has a coefficient of thermal expansion within $\pm 2 \times 10^{-6}$/° C. of the coefficient of thermal expansion of the substrate.

Figure 1:
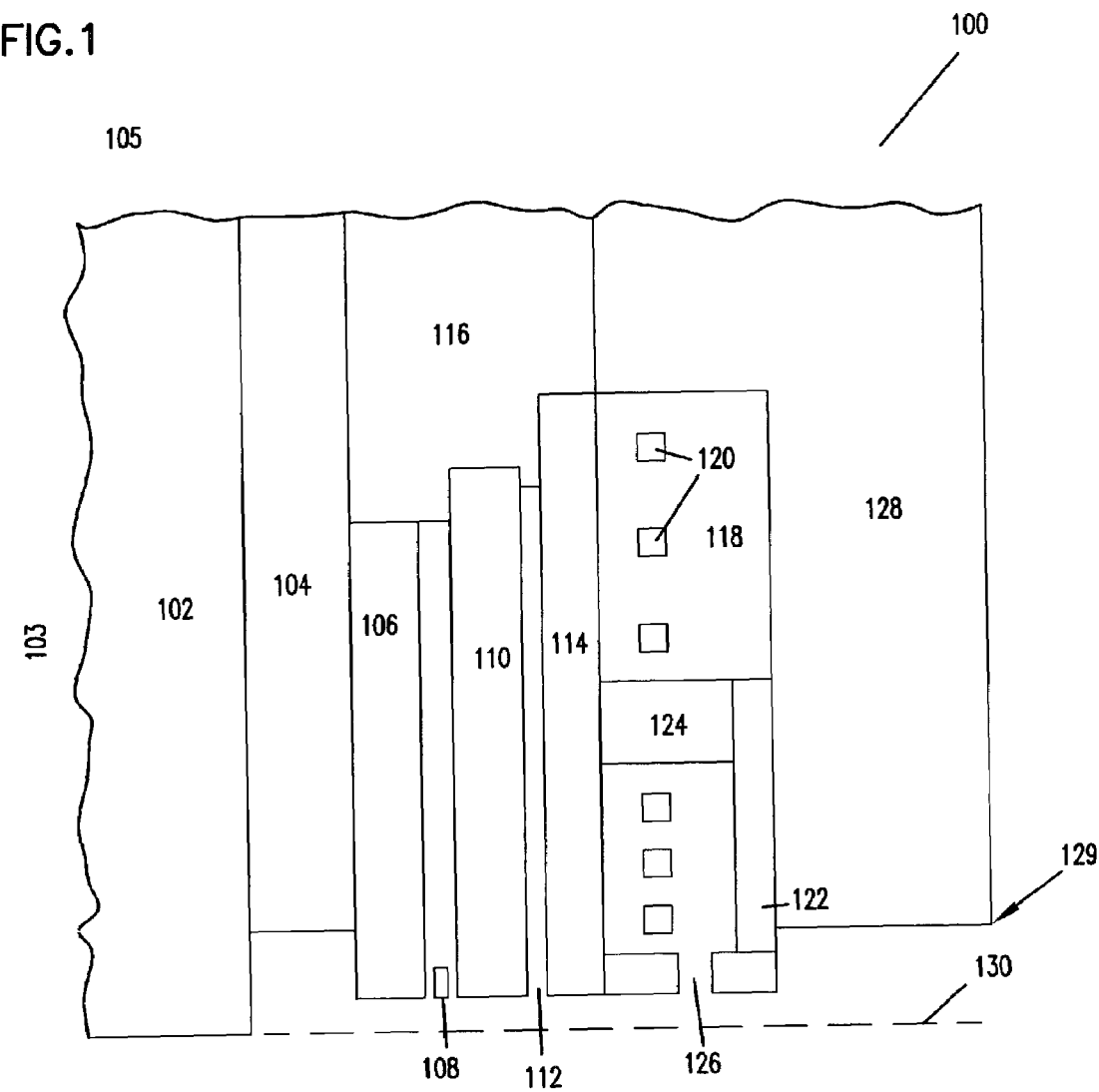
FIG. 1 illustrates a cross-section of a magnetic recording head in accordance with one aspect of the invention.

FIG. 1 depicts a cross section of a magnetic recording head in accordance with the invention made along a plane perpendicular to the air bearing surface (ABS). The magnetic recording head depicted in FIG. 1 is one embodiment of a magnetic recording head in accordance with the invention, it should be understood that magnetic recording heads with additional, or fewer structural features, are contemplated and are within the scope of this invention.

A magnetic recording head 100 in accordance with one aspect of the invention includes a substrate 102, a bottom shield 106, a read sensor 108, and a top shield 110.

The substrate 102 functions to provide support to the rest of the magnetic recording head 100. A large part of the magnetic recording head 100 and related structures (e.g. slider) can be built from the substrate 102 and extend beyond the edges 103 and 105 depicted in FIG. 1. For the sake of simplicity, this is not included in the view depicted in FIG. 1. The head cross-section in FIG. 1 is made along the plane perpendicular to the ABS 130 through a portion of the magnetic recording head 100 close to a trailing edge 129 of the magnetic recording head 100.

The substrate 102 can be made from any material that provides structure and support to the rest of the magnetic recording head 100, and provides rigidity for correct flight characteristics of the device. Any material, known to those of ordinary skill in the art, that provides such characteristics can be utilized for the substrate 102. In one embodiment of the invention, the substrate 102 is made of an electrically conducting ceramic material made primarily from $Al_2O_3$ and TiC, referred to herein as "AlTiC". Generally, AlTiC has a coefficient of thermal expansion (CTE) of between about $6 \times 10^{-6}$/° C. and $7 \times 10^{-6}$/° C. In another embodiment of the invention, the substrate 102 can be made from silicon (Si). Silicon generally has a smaller CTE than AlTiC, typically between about $2.3 \times 10^{-6}$/° C. and $2.9 \times 10^{-6}$/° C. The invention also contemplates the substrate 102 being made from other acceptable materials which have their own CTE values.

A magnetic recording head 100 in accordance with the invention also includes a read sensor 108. The read sensor 108 functions to read the information from storage medium by sensing the magnetic field that has been written to the storage medium. Generally, the read sensor 108 can be of a magnetoresistive (MR) or giant magnetoresistive (GMR) type.

A magnetic recording head 100 in accordance with the invention also includes at least one magnetic shield. In FIG. 1, two magnetic shields are depicted, a top shield 110 and a bottom shield 106. At least one magnetic shield that is included in a magnetic recording head 100 of the invention is positioned adjacent to the read sensor 108, as depicted in FIG. 1.

The bottom shield 106 and the top shield 110 function to reduce unwanted magnetic fields coming from the storage medium, so that the read sensor 108 "sees" only the magnetic field from the specific recorded data bit to be read. Optionally, in a merged head the top shield 110 also functions as one pole of the inductive write head.

In one embodiment of a magnetic recording head 100 in accordance with the invention, the bottom shield 106, the top shield 110, or both the bottom shield 106 and the top shield 110 are made of a material having a CTE within $\pm 2 \times 10^{-6}$/° C. of the CTE of the material making up the substrate 102. More preferably, the CTE of the bottom shield 106, the top shield 110, or both the bottom shield 106 and the top shield 110 is within $\pm 1 \times 10^{-6}$/° C. of the CTE of the material making up the substrate 102.

In another embodiment of the invention, a magnetic recording head 100 includes a substrate 102 made of AlTiC, which has a CTE of about $6 \times 10^{-6}$/° C. to about $7 \times 10^{-6}$/° C. In this embodiment, the bottom shield 106, the top shield 110, or both the bottom shield 106 and the top shield 110 are made of a material having a CTE within $\pm 1 \times 10^{-6}$/° C. of the CTE of the substrate 102. Therefore, in this embodiment, the bottom shield 106, the top shield 110, or both the bottom shield 106 and the top shield 110 are made of a material having a CTE of about $5 \times 10^{-6}$/° C. to about $8 \times 10^{-6}$/° C. More preferably, the bottom shield 106, the top shield 110, or both the bottom shield 106 and the top shield 110 are made of a material having a CTE of about $6 \times 10^{-6}$/° C. to about $7 \times 10^{-6}$/° C.

Examples of materials that can be used for the bottom shield 106, the top shield 110 or both the bottom shield 106 and the top shield 110 with a CTE of about $5 \times 10^{-6}$/° C. to about $8.0 \times 10^{-6}$/° C. include but are not limited to alloys of Nickel (Ni) and Iron (Fe) (Ni Fe alloys), alloys of Nickel (Ni), Cobalt (Co), and Iron (Fe) (Ni Co Fe alloys), and Ni Fe alloys or Ni Co Fe alloys with an additional element that decreases the CTE but does not substantially alter the magnetic shielding effects of the alloy. Alloys are described herein as including weight percents of the two or more elements that make them up, for example, a 31.5% Ni, 68.5% Fe contains 31.5 percent of nickel by weight and 68.5% iron by weight.

Figure 2:
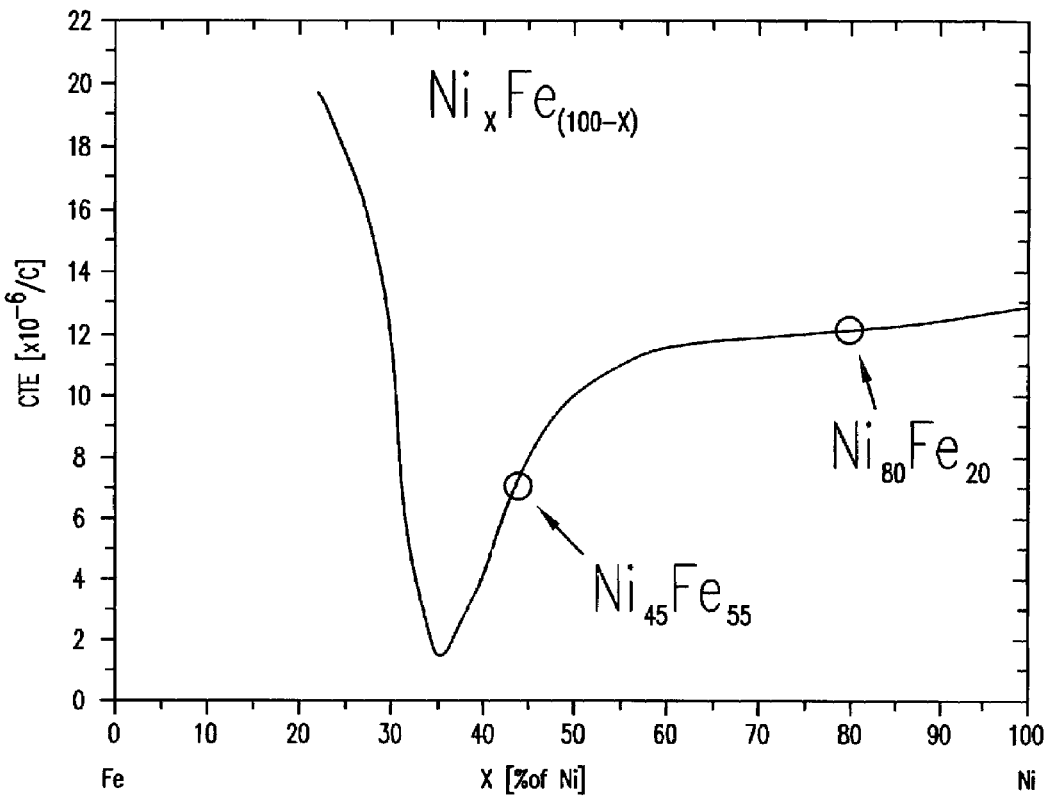
FIG. 2 illustrates the dependence of the coefficient of thermal expansion (CTE) of a nickel iron alloy on the percent nickel in the alloy composition.

Examples of Ni Fe alloys that can be used as the materials of the bottom shield 106, the top shield 110 or both the bottom shield 106, and the top shield 110 can be determined in part by looking at FIG. 2. FIG. 2 illustrates the CTE of a Ni Fe alloy as a function of the percent nickel in the Ni Fe alloy. FIG. 2 can be used to determine particular alloy compositions that can be utilized in embodiments of the invention. Particular alloy compositions to be used in embodiments of the invention are ascertained by finding alloy compositions with CTE values within a desired range.

In an embodiment of the invention where the substrate 102 is made of AlTiC, the materials of the bottom shield 106, the top shield 110 or both the bottom shield 106, and the top shield 110 are made of a Ni Fe alloy having a composition of about 31 to 32.5% nickel or about 42 to 45% nickel. Preferably, the Ni Fe alloy is a 31.5% Ni, 68.5% Fe alloy, or a 45% Ni, 55% Fe alloy. Most preferably, both the bottom shield 106 and the top shield 110 are made of either a 31.5% Ni, 68.5% Fe alloy, or a 45% Ni, 55% Fe alloy, or combinations thereof.

Figure 3:
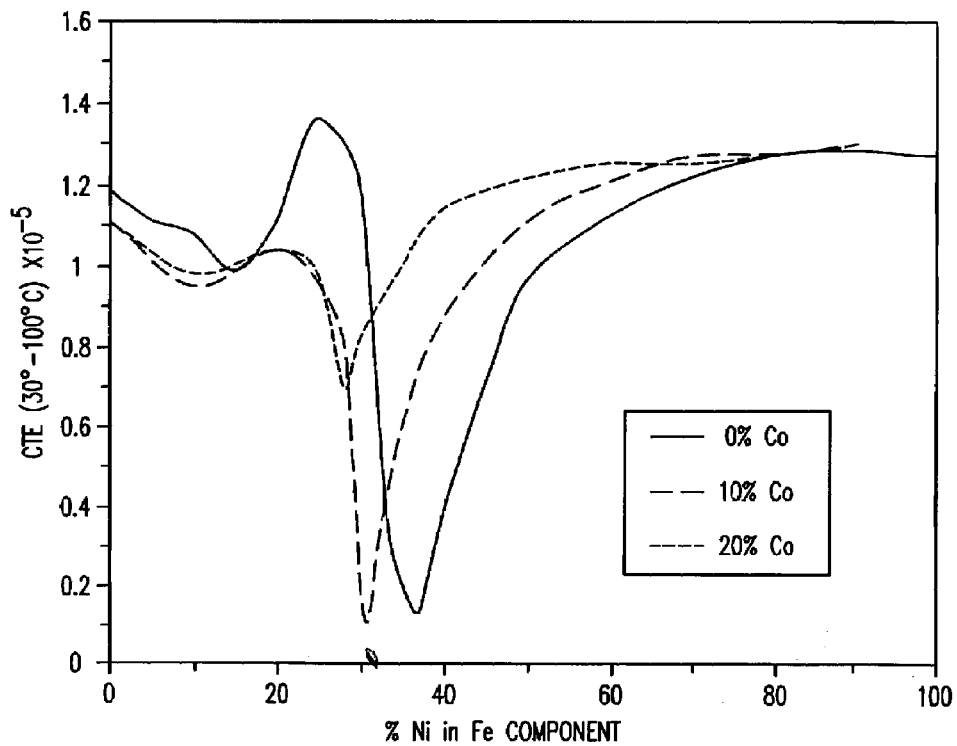
FIG. 3 illustrates the dependence of the coefficient of thermal expansion (CTE) of a nickel iron cobalt alloy on the percent nickel in the iron component of the alloy composition.

Examples of Ni Co Fe alloys that can be used as the materials of the bottom shield 106, the top shield 110 or both the bottom shield 106, and the top shield 110 can be determined in part by looking at FIG. 3. FIG. 3 illustrates the CTE of a Ni Co Fe alloy as a function of the percent nickel in the iron component of the alloy. In one embodiment of the invention where the substrate 102 is made of AlTiC, the materials of the bottom shield 106, the top shield 110 or both the bottom shield 106, and the top shield 110 are made of a Ni Co Fe alloy having a composition of about 21–24% Ni, about 20% Co, and about 56–59% Fe; about 24.3–26.6% Ni, about 10% Co, and about 63–66% Fe; about 30–34% Ni, about 10% Co, and about 55–59% Fe; or combinations thereof. More preferably, the Ni Co Fe alloy is a 36.5% Ni, 10% Co, 53.5% Fe alloy; a 28% Ni, 10% Co, 62% Fe alloy; or a 28% Ni, 20% Co, 52% Fe alloy. Most preferably, both the bottom shield 106 and the top shield 110 are made of a 36.5% Ni, 10% Co, 53.5% Fe alloy; a 28% Ni, 10% Co, 62% Fe alloy; a 28% Ni, 20% Co, 52% Fe alloy; or combinations thereof.

Ni Fe alloys and Ni Co Fe alloys with an additional element or additional elements can also be used as materials for the bottom shield 106, the top shield 110, or both the bottom shield 106 and the top shield 110. The additional elements function to decrease the CTE of the alloys without substantially altering the magnetic shielding of the alloys. An element that decreases the CTE of the alloy is one that, in the amount added to the alloy, renders the CTE of the alloy within $\pm 2 \times 10^{-6}/°$ C. of the CTE of the substrate 102. In an embodiment where the substrate 102 is AlTiC, an element, or combination of elements decreases the CTE of the alloy if the CTE is about $5 \times 10^{-6}/°$ C. to about $8 \times 10^{-6}/°$ C. after addition of the element or elements.

Examples of elements that can be used as additional elements in Ni Fe and/or Ni Co Fe alloys include but are not limited to tungsten (W), molybdenum (Mo), chromium (Cr), osmium (Os), zirconium (Zr), hafnium (Hf), boron (B), germanium (Ge), tantalum (Ta), cerium (Ce), ruthenium (Ru), and iridium (Ir). Alternatively, two or more of these additional elements can be used in any one alloy. In one embodiment of the invention, chromium (Cr) is utilized as an additional element.

Generally these additional elements are added to an alloy composition that has acceptable magnetic shielding properties, but an undesirable CTE value. In a magnetic recording head wherein the substrate 102 is made of AlTiC, alloys with acceptable magnetic shielding properties include but are not limited to 45% Ni, 55% Fe; 31.5% Ni, 68.5% Fe; 36.5% Ni, 10% Co, 53.5% Fe; 28% Ni, 10% Co, 62% Fe; and 28% Ni, 20% Co, 52% Fe. An additional element or elements could be added to any of these alloys. In one embodiment, additional elements are added to a 45% Ni, 55% Fe alloy. Generally, these additional elements are added in amounts which function to decrease the CTE value so that it is within $\pm 2 \times 10^{-6}/°$ C. of the CTE of AlTiC, or about $6 \times 10^{-6}/°$ C. to about $8 \times 10^{-6}/°$ C.

In order to determine the efficacy of a combination of an alloy with at least one additional element, a number of characteristics can be monitored. These characteristics include but are not limited to CTE, magnetorestriction, permeability, anisotropy, and non-corrosiveness. Any combination of one or more of these characteristics or others that relate to the ability of a material to function as a magnetic shield with a smaller contribution to T-PTR can be monitored and considered.

In one embodiment, magnetorestriction and CTE are monitored. In such an embodiment, the magnitude of the magnetorestriction should be small, preferably about $\pm 1 \times 10^{-6}$ ppm. The CTE in such an embodiment, should be about $\pm 2 \times 10^{-6}/°$ C. of the CTE of the material making up the substrate 102. In an embodiment where the substrate 102 is AlTiC, the CTE of the magnetic shield material is preferably between about $8 \times 10^{-6}/°$ C. and about $6 \times 10^{-6}/°$ C.

In another embodiment, magnetorestriction, CTE, and coercivity can be monitored. In this embodiment, the magnitude of the magnetorestriction should be small, preferably about $\pm 1 \times 10^{-6}$ ppm. The CTE in this embodiment, should be about $\pm 2 \times 10^{-6}/°$ C. of the CTE of the material making up the substrate 102. In an embodiment where the substrate 102 is AlTiC, the CTE of the magnetic shield material is preferably between about $5 \times 10^{-6}/°$ C. and about $8 \times 10^{-6}/°$ C. In this embodiment, the coercivity of the material making up the shields should be low. In one embodiment, the coercivity is less than about 10 Oersteds (Oe) preferably less than about 1 Oe.

In another embodiment of the invention, a magnetic recording head 100 includes a substrate 102 made of silicon (Si), which has a CTE of from about $2.3 \times 10^{-6}/°$ C. to about $2.9 \times 10^{-6}/°$ C. In this embodiment, the bottom shield 106, the top shield 110, or both the bottom shield 106 and the top shield 110 are made of a material having a CTE within $\pm 2 \times 10^{-6}/°$ C. of the CTE of the substrate 102. Preferably, the bottom shield 106, the top shield 110, or both the bottom shield 106 and the top shield 110 are made of a material having a CTE from about $0.3 \times 10^{-6}/°$ C. to about $4.9 \times 10^{-6}/°$ C. More preferably, the bottom shield 106, and the top shield 110, or both the bottom shield 106 and the top shield 110 are made of a material having a CTE of about $1.3 \times 10^{-6}/°$ C. to about $3.9 \times 10^{-6}/°$ C.

Examples of materials that can be used for the bottom shield 106, the top shield 110 or both the bottom shield 106, the top shield 110 with a CTE of from about $1.3 \times 10^{-6}/°$ C. to about $3.9 \times 10^{-6}/°$ C. include but are not limited to Ni Fe alloys, Ni Co Fe alloys, and Ni Fe alloys or Ni Co Fe alloys with an additional element that decreases the CTE but does not substantially alter the magnetic shielding properties of the material.

Examples of Ni Fe alloys that can be used for the materials of the bottom shield 106, the top shield 110 or both the bottom shield 106, and the top shield 110 can be determined in part by referring again to FIG. 2. In an embodiment of the invention where the substrate 102 is made of Si, the materials of the bottom shield 106, the top shield 110 or both the bottom shield 106, and the top shield 110 are made of a Ni Fe alloy having a composition of about 28 to about 32% Ni and about 58 to about 64% Fe. More preferably, the Ni Fe alloy is a 38% Ni, 62% Fe alloy. Most preferably, both the bottom shield 106 and the top shield 110 are made of a 38% Ni, 62% Fe alloy.

Examples of Ni Co Fe alloys that can be used as the materials of the bottom shield 106, the top shield 110 or both the bottom shield 106, and the top shield 110 can be determined in part by again referring to FIG. 3. In an embodiment of the invention where the substrate 102 is made of Si, the materials of the bottom shield 106, the top shield 110 or both the bottom shield 106, and the top shield 110 are made of a Ni Co Fe alloy having a composition of about 26 to 29% Ni, about 10% Co, and about 60 to 64% Fe. More preferably, the Ni Co Fe alloy is a 31.5% Ni, 10% Co, 58.5% Fe alloy. Most preferably, both the bottom shield 106 and the top shield 110 are made of a 31.5% Ni, 10% Co, 58.5% Fe alloy.

Ni Fe and Ni Co Fe with an additional element or additional elements can also be used as materials for the bottom shield 106, the top shield 110, or both the bottom shield 106 and the top shield 110 when the substrate 102 is made of Si. The additional elements function to decrease the CTE of the alloys without substantially altering the magnetic shielding properties of the alloys. An element that decreases the CTE of the alloy is one that, in the amount added to the alloy, renders the CTE of the alloy within $\pm 2 \times 10^{-6}/°$ C. of the CTE of the substrate 102, Si, for example. In an embodiment where the substrate 102 is Si, an element or combination of elements decreases the CTE of the alloy if the CTE is about $1.3 \times 10^{-6}/°$ C. to about $3.9 \times 10^{-6}/°$ C. after addition of the element or elements.

Examples of elements that can be used as additional elements in Ni Fe and/or Ni Co Fe alloys include but are not limited to tungsten (W), molybdenum (Mo), chromium (Cr), osmium (Os), zirconium (Zr), hafnium (Hf), boron (B), germanium (Ge), tantalum (Ta), cerium (Ce), ruthenium (Ru), and iridium (Ir). Alternatively, two or more of these additional elements can be used in any one alloy. In one embodiment, chromium (Cr) is utilized as an additional element.

Generally these additional elements are added to an alloy composition that has acceptable magnetic shielding properties. In a magnetic recording head where the substrate 102 is made of Si, alloys with acceptable magnetic shielding properties include but are not limited to 45% Ni, 55% Fe; 31.5% Ni, 68.5% Fe; 36.5% Ni, 10% Co, 53.5% Fe; 28% Ni, 10% Co, 62% Fe; and 28% Ni, 20% Co, 52% Fe. Generally, these additional elements are added in amounts which function to decrease the CTE to within $\pm 2 \times 10^{-6}/°$ C. of the CTE of Si, or about $1.3 \times 10^{-6}/°$ C. to about $3.9 \times 10^{-6}/°$ C.

In order to determine the efficacy of a combination of an alloy with at least one additional element, a number of characteristics can be monitored. These characteristics include but are not limited to CTE, magnetorestriction, permeability, anisotropy, and non-corrosiveness. Any combination of one or more of these characteristics or others that relate to the ability of a material to function as a magnetic shield with a smaller contribution to T-PTR can be monitored and considered.

In one embodiment, magnetorestriction and CTE are monitored. In such an embodiment, the magnitude of the magnetorestriction should be small, preferably about $\pm 1 \times 10^{-6}$ ppm. The CTE in such an embodiment, should be about $\pm 2 \times 10^{-6}/°$ C. of the CTE of the material making up the substrate 102. In an embodiment where the substrate 102 is Si, the CTE of the magnetic shield material is preferably between about $1.3 \times 10^{-6}/°$ C. and about $3.9 \times 10^{-6}/°$ C.

In another embodiment, magnetorestriction, CTE, and coercivity can be monitored. In this embodiment, the magnitude of the magnetorestriction should be small, preferably about $\pm 1 \times 10^{-6}$ ppm. The CTE in this embodiment, should be about $\pm 2 \times 10^{-6}/°$ C. of the CTE of the material making up the substrate 102. In an embodiment where the substrate 102 is Si, the CTE of the magnetic shield material is preferably between about $1.3 \times 10^{-6}/°$ C. and about $3.9 \times 10^{-6}/°$ C. In this embodiment, the coercivity of the material making up the shields should be low. In one embodiment, the coercivity is less than about 10 Oe, preferably less than about 1 Oe.

Another embodiment of a magnetic recording head 101 of the invention includes a substrate 102, a read sensor 108, and at least one shield positioned adjacent the read sensor, wherein said at least one shield is thin.

In one embodiment of a magnetic recording head 101 in accordance with the invention a magnetic shield that is thin has a thickness of from about 0.05 μm to about 0.5 μm. In another embodiment, the thickness of the bottom shield, the top shield, or both the bottom shield and the top shield are from about 0.05 μm to about 0.5 μm. In one embodiment of the invention either the bottom shield or the top shield have a thickness of from about 0.05 μm to about 0.5 μm, and the other shield has a thickness that is greater than 0.5 μm. Preferably, the thickness ranges from about 0.1 μm to about 0.4 μm. The minimization of the T-PTR with thin magnetic shields must be weighed against the decrease in the magnetic shielding offered by the thin shields.

Figure 4:
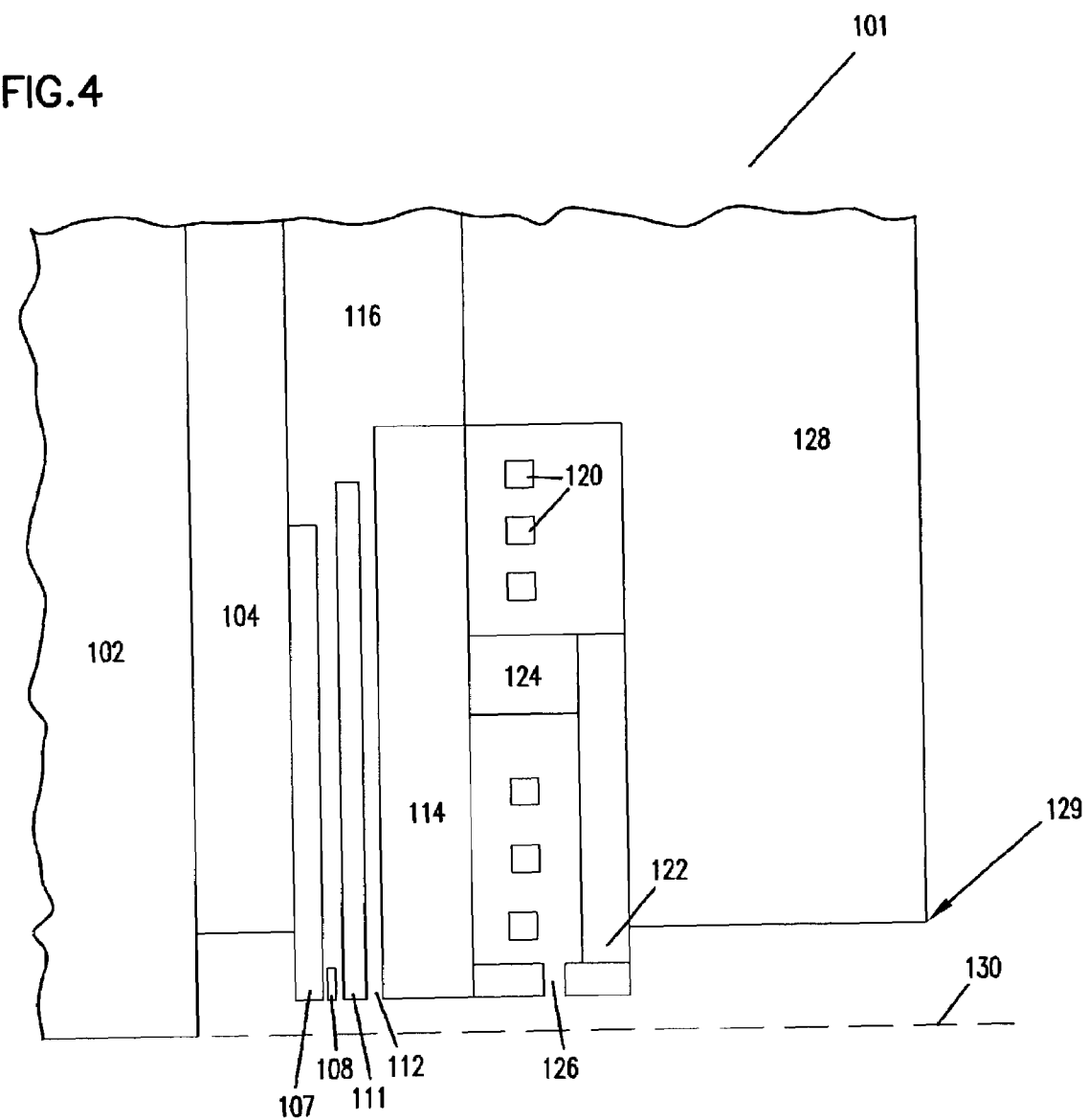
FIG. 4 illustrates a cross-section of a magnetic recording head in accordance with another aspect of the invention.

One embodiment of a magnetic recording head 101 in accordance with one aspect of the invention is depicted in FIG. 4. In this embodiment, the thin bottom shield 107, the thin top shield 111, or both the thin bottom shield 107 and the thin top shield 111 are made of materials with good magnetic shielding characteristics. Materials that have such magnetic shielding characteristics generally have desirable values of permeability and coercivity. Examples of such materials include but are not limited to Ni Fe alloys with a composition of about 80% Ni, 20% Fe; Sendust (an alloy with an approximate concentration of 85% Fe, 6% Al, and 9% Si); amorphous cobalt alloys, or combinations thereof.

Figure 5:
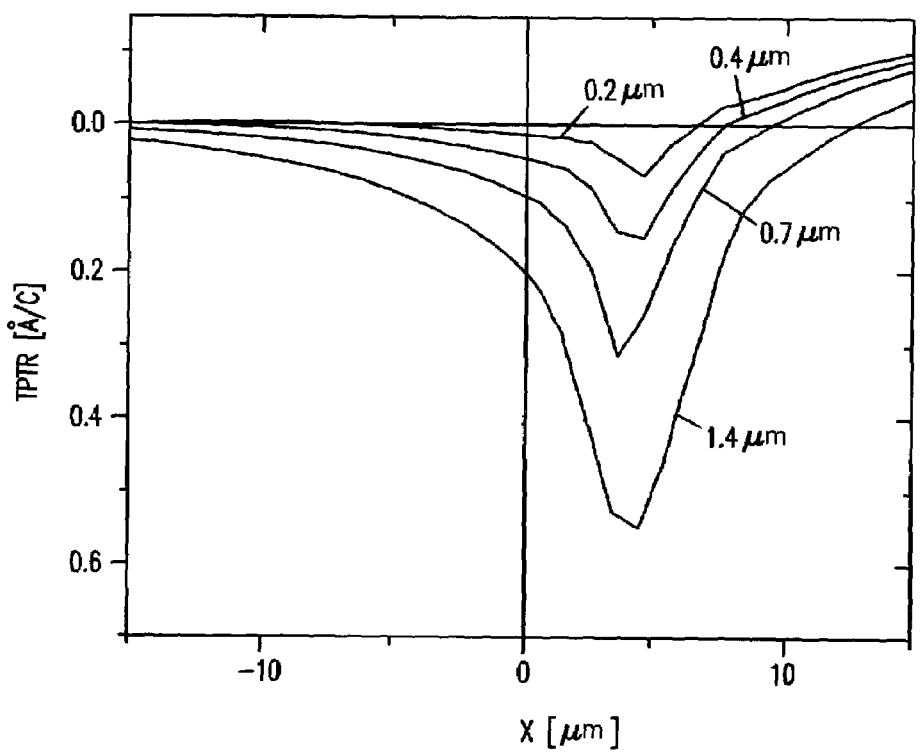
FIG. 5 shows a graph depicting the thermal pole tip recession (T-PTR) of pole tips and shields as the thickness of the bottom and top shield ranges from 0.2 to 1.4 μm.
Figure 6:
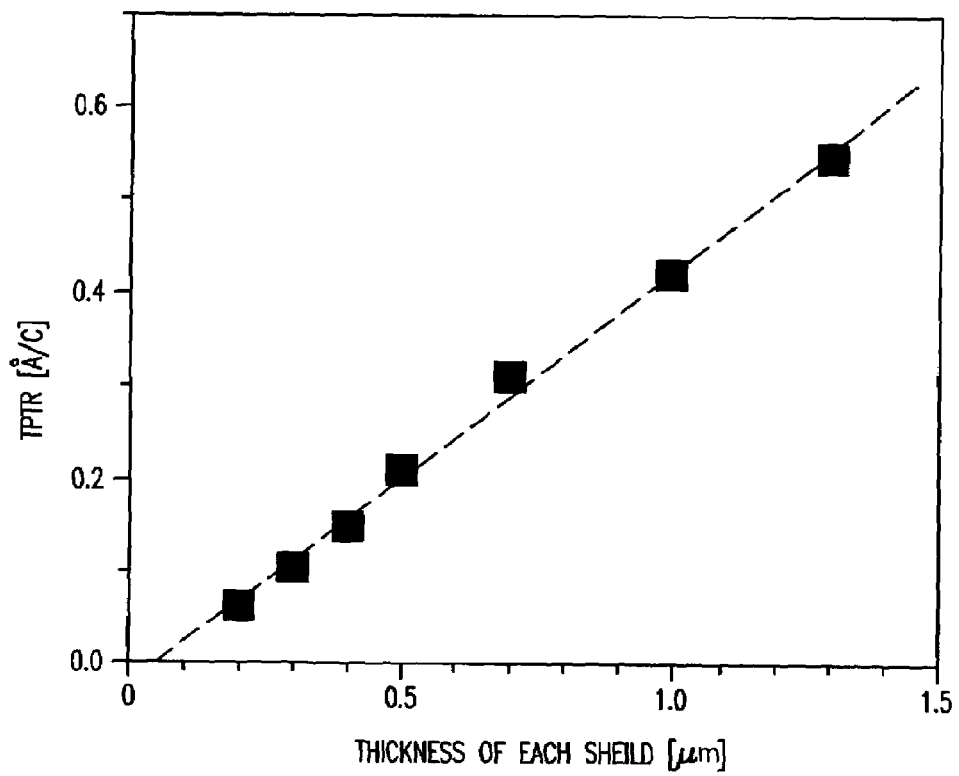
FIG. 6 shows the dependence of the maximum thermal protrusion on the thickness of the bottom and top shield.

The contribution of the magnetic shields to thermal pole tip recession (T-PTR) in these embodiments is minimized by making at least one magnetic shield, such as the thin bottom shield 107, the thin top shield 111 or both the thin bottom shield 107 and the thin top shield 111 thinner than magnetic shields in prior art magnetic recording heads. Preferably, both the thin bottom shield 107 and the thin top shield 111 are thinner than magnetic shields of prior art magnetic recording heads. FIG. 5 depicts the T-PTR of pole tips and shields as a function of the thickness of the bottom shield and the top shield. The graph shows values of thickness ranging from 0.2 to 1.4 μm. FIG. 6 shows the maximum thermal protrusion as a function of the thickness of the bottom shield and the top shield.

Methods of fabricating magnetic shields are well known to those of ordinary skill in the art. Examples of useful methods include but are not limited to one step vacuum deposition (e.g. sputtering). In one embodiment, fabrication of a magnetic recording head 101 with a thin bottom shield 107, thin top shield 111, or both a thin bottom shield 107 and a thin top shield 111 offers an advantage over fabrication of other magnetic recording heads because the thin bottom shield 107, the read sensor 108, and the thin top shield 111 can be fabricated without a preceding chemical mechanical planarization (CMP) step. Elimination of this step offers a reduction in manufacturing cycle time that may be significant.

If a magnetic recording head 101 of the invention is fabricated with a thin bottom shield 107, the shape of the thin bottom shield 107 can be defined by any method known to those of ordinary skill in the art, including but not limited to ion milling, wet etching, or a lift-off process.

If a magnetic recording head 101 in accordance with the invention is fabricated with a thin top shield 111, which is a part of the shared pole, the seed layer for the shared pole plating can also serve as the thin top shield 111. Subsequent processing steps could then plate a non-magnetic spacer which magnetically separates the reader and writer followed by fabrication of more layers for the bottom pole.

An alternative method of fabricating a magnetic recording head 101 with a thin top shield 111 includes the deposition of the thin top shield 111 by any method known to those of ordinary skill in the art, for example sputtering. In this embodiment, the deposition of the thin top shield 111 is followed by definition thereof, deposition of a dielectric spacer to magnetically separate the reader from the writer, and formation of the bottom pole by deposition of a seed layer and subsequent plating, or by vacuum deposition of thicker magnetic layers.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A magnetic recording head comprising:
   (a) a substrate comprising AlTiC, and having a coefficient of thermal expansion of about $6\times10^{-6}/°$ C. to about $7\times10^{-6}/°$ C.;
   (b) a read sensor; and
   (c) at least one shield positioned adjacent said read sensor, said at least one shield having a coefficient of thermal expansion of about $8\times10^{-6}/°$ C. to about $6\times10^{-6}/°$ C.

2. The magnetic recording head of claim 1, wherein contribution to thermal pole-tip recession is less than about 0.3 Å/° C.

3. The magnetic recording head of claim 1, wherein said at least one shield has a coefficient of thermal expansion within $\pm2\times10^{-6}/°$ C. of the coefficient of thermal expansion of said substrate.

4. The magnetic recording head of claim 1, wherein contribution to thermal pole-tip recession is less than about 0.4 Å/° C.

5. The magnetic recording head of claim 1, wherein said at least one shield comprises: nickel iron alloy, nickel cobalt iron alloy, or combinations thereof.

6. The magnetic recording head of claim 5, wherein said at least one shield comprises a nickel iron alloy.

7. The magnetic recording head of claim 6, wherein said nickel iron alloy has about 31 to about 32.5% nickel, or about 42 to about 45% nickel.

8. The magnetic recording head of claim 7, wherein said nickel iron alloy is a 31.5% nickel, 68.5% iron alloy or a 45% nickel, 55% iron alloy.

9. The magnetic recording head of claim 5, wherein said at least one shield comprises a nickel cobalt iron alloy.

10. The magnetic recording head of claim 9, wherein said nickel cobalt iron alloy is chosen from the group consisting of a nickel cobalt iron alloy having a composition of about 21 to 24% nickel, about 20% cobalt, about 56 to 59% iron, a nickel cobalt iron alloy having a composition of about 24.3 to 26.6% nickel, about 10% cobalt about 63.6% iron, and a nickel cobalt iron alloy having a composition of about 30 to 34% nickel, about 10% cobalt, about 55 to 59% iron.

11. The magnetic recording head of claim 5, wherein said at least one shield further comprises at least one additional element that decreases the coefficient of thermal expansion of the shield.

12. The magnetic recording head of claim 11, wherein said additional element is chosen from the group consisting of: tungsten, molybdenum, chromium, osmium, zirconium, hafnium, boron, germanium, tantalum, cerium, ruthenium, iridium, and combinations thereof.

13. The magnetic recording head of claim 12, wherein said additional element comprises chromium.

14. The magnetic recording head of claim 1, wherein said at least one shield is chosen from the group consisting of a nickel iron alloy with about 32 to about 40% nickel and a nickel cobalt iron alloy with about 32 to about 29% nickel and about 10% cobalt.

15. The magnetic recording head of claim 1, wherein said at least one shield has a thickness of less than about 0.5 μm.

16. The magnetic recording head of claim 15, wherein said thickness is between about 0.5 μm and about 0.5 μm.

17. The magnetic recording head of claim 16, wherein said shield comprises an 80% nickel, 20% iron alloy, or Sendust.

18. A magnetic recording head comprising:
   (a) a substrate selected from the group consisting of AlTi.C and Silion having a coefficient of thermal expansion;
   (b) a read sensor; and
   (c) at least one shield positioned adjacent said sensor, wherein said shield has a coefficient of thermal expansion between about $1.3\times10^{-6}/°$ C. and about $3.9\times10^{-6}/°$ C. of said substrate.

19. The magnetic recording head of claim 18, wherein said substrate is AlTiC.

20. The magnetic recording head of claim 19, wherein said at least one shield has a coefficient of thermal expansion of between about $8\times10^{-6}/°$ C. and about $6\times10^{-6}/°$ C.

21. The magnetic recording head of claim 18, wherein said at least one shield comprises: a nickel iron alloy or a nickel cobalt iron alloy.

22. The magnetic recording head of claim 21, wherein said nickel iron alloy has about 31 to 32.5% nickel or about 42 to 45% nickel.

23. The magnetic recording head of claim 21, wherein said nickel iron alloy is a 31.5% nickel, 68.5% iron alloy or a 45% nickel, 55% iron alloy.

24. The magnetic recording head of claim 21, wherein said at least one shield comprises a nickel iron cobalt alloy.

25. The magnetic recording head of claim 24, wherein said nickel cobalt iron alloy is chosen from the group consisting of: a nickel cobalt iron alloy having a composition of about 21 to 24% nickel, about 20% cobalt, about 56 to 59% iron, a nickel cobalt iron alloy having a composition of about 24.3 to 26.6% nickel, about 10% cobalt, about 63.6% iron, and a nickel cobalt iron alloy having a composition of about 30 to 34% nickel, about 10% cobalt, about 55 to 59% iron.

26. The magnetic recording head of claim 21, wherein said at least one shield is chosen from the group consisting of a nickel iron alloy with about 32 to about 40% nickel and a nickel cobalt iron alloy with about 26 to about 29% nickel and about 10% cobalt.

27. The magnetic recording head of claim 21, wherein said at least one shield further comprises at least one additional element that decreases the coefficient of thermal expansion of the shield.

28. The magnetic recording head of claim 27, wherein said additional element is chosen from the group consisting of: tungsten, molybdenum, chromium, osmium, zirconium, hafnium, boron, germanium, tantalum, cerium, ruthenium, iridium, and combinations thereof.

29. The magnetic recording head of claim 28, wherein said additional element comprises chromium.

30. A magnetic recording head comprising:
   (a) a substrate;
   (b) a read sensor; and
   (c) at least one thin shield positioned adjacent said read sensor, wherein said at least one thin shield has a thickness of less than about 0.1 µm, and wherein said at least one thin shield functions to decrease the thermal pole tip recession.

31. The magnetic recording head of claim 30, wherein said at least one thin shield has a thickness of between about 0.05 µm and less than about 0.1 µm.

32. The magnetic recording head of claim 31, wherein said shield comprises approximately 80% nickel, 20% iron, or Sendust.

* * * * *